United States Patent [19]

Aoki

[11] Patent Number: 4,825,332

[45] Date of Patent: Apr. 25, 1989

[54] ELECTROMAGNETIC DRIVING CIRCUIT

[76] Inventor: Hiroshi Aoki, 1-1, Taihei 4-chome, Sumida-ku, Tokyo, Japan

[21] Appl. No.: 155,260

[22] Filed: Feb. 12, 1988

[30] Foreign Application Priority Data

Feb. 20, 1987 [JP] Japan .................. 62-37132
Feb. 25, 1987 [JP] Japan .................. 62-41817
Mar. 6, 1987 [JP] Japan .................. 62-51261

[51] Int. Cl.$^4$ .............. H01H 47/00; H01H 47/12; G04B 17/16; G04F 5/00
[52] U.S. Cl. .................. 361/152; 361/159; 361/203; 368/166; 368/181
[58] Field of Search ............ 368/165, 166, 181; 84/484; 361/159, 203

[56] References Cited

U.S. PATENT DOCUMENTS 4,196,579  4/1980  Schaefer .................. 368/165

Primary Examiner—L. T. Hix
Assistant Examiner—David Porterfield
Attorney, Agent, or Firm—Bruce L. Adams; Van C. Wilks

[57] ABSTRACT

An electromagnetic driving circuit for driving a pendulum comprises a coil for detecting and driving a permanent magnet, a comparison circuit for comparing an induction voltage induced in the coil with a reference voltage, a generating circuit for generating driving pulses of a predetermined pulse width in response to outputs of the comparison circuit, and a driving circuit for flowing a driving current through the coil in accordance with the driving pulses. The timing at which the driving pulses are generated and/or the pulse width of the driving pulses are automatically adjusted to optimum values to improve the driving efficiency of the pendulum.

5 Claims, 7 Drawing Sheets

ELECTROMAGNETIC DRIVING CIRCUIT

BACKGROUND OF THE INVENTION

1. Field of the Invention:

The present invention is directed to an electromagnetic driving circuit for driving a pendulum or the like.

Figure 9:
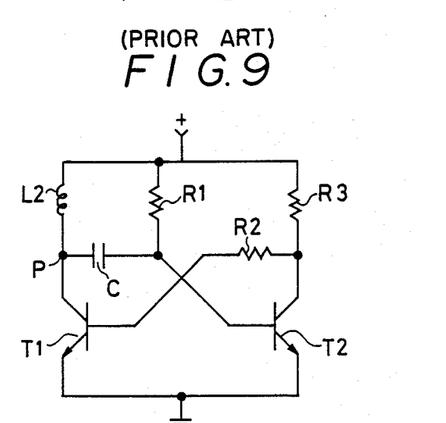
FIG. 9 is a electric circuit diagram illustrating a conventional circuit constitution.
Figure 10:
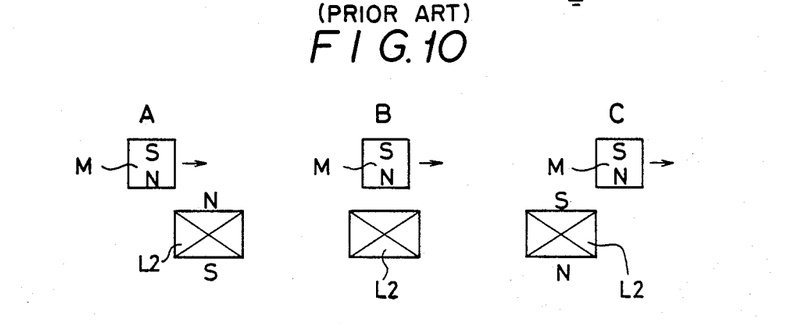
FIG. 10 is an explanatory diagram depicting one example of relation between a permanent magnet of a pendulum and a coil thereof.

2. Description of the Prior Art:

Turning first to FIG. 9, there is illustrated a driving circuit for detecting and driving a pendulum of, e.g., a clock by use of a coil. The operation of this circuit will now be described. When a permanent magnet M, as illustrated in FIG. 10A, approaches a coil $L_2$, an induction voltage is generated in the coil $L_2$ in such a direction as to repulse the magnet M. As depicted in FIG. 10B, when the magnet M is disposed opposite to the coil $L_2$, the induction voltage comes to 0. As shown in FIG. 10C, where the magnet M moves away from the coil $L_2$, the induction voltage is created in the coil $L_2$ in such a direction as to attract the magnet. Polarity of the induction voltage, as illustrated in FIG. 11A or 11C, differs depending on the direction in which the coil $L_2$ is wound.

Figure 11:
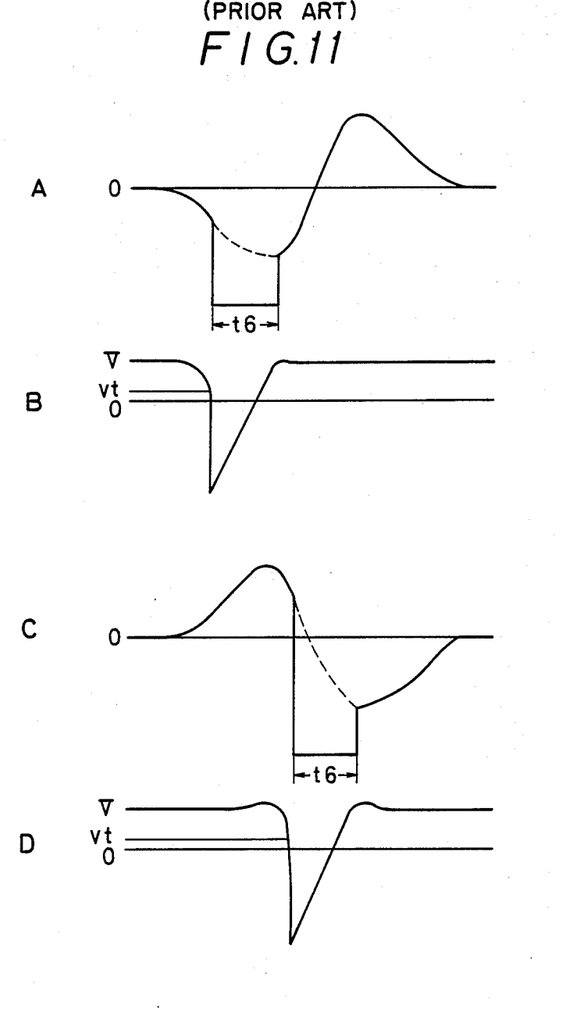
FIGS. 11 and 12 are voltage waveform diagrams showing the operation of FIG. 9.

First, the operation in the case of generating the induction voltage shown in FIG. 11A will be discussed. A base voltage of a transistor $T_2$ is, as depicted in FIG. 11B, clamped by a given voltage V by virtue of diode properties of its base/emitter. If the base voltage of the transistor $T_2$ decreases below a threshold voltage $v_t$ due to the induction voltage shown in FIG. 11A which is generated at a terminal p of FIG. 9, however, the transistor $T_2$ is turned OFF. For this reason, the transistor $T_1$ is inversely turned ON. Then a driving current flows through the coil $L_2$ for a time $t_6$ determined by time constants of a capacitor $C_1$ and a resistance $R_1$, whereby the magnet M is attractively driven.

Where the induction voltage is, as shown in FIG. 11C, generated, the base voltage of the transistor $T_2$ is held substantially at the voltage V because of the diode properties thereof even if the voltage of the terminal p exhibits such an increase as illustrated in FIG. 11C. When the induction voltage exceeds a peak, the base voltage of the transistor $T_2$ is lowered with a drop in the foregoing voltage. The base voltage then decreases below the threshold voltage $v_t$, at which time the transistor $T_2$ is turned OFF. Subsequently, the driving current, as in the former case, flows through the coil $L_2$, thereby repulsively driving the magnet M.

For more efficient drive of the magnet, the coil is driven at a timing illustrated in FIG. 10A in the case of attraction-drive. Where the repulsion-drive is adopted, it is desirable to drive the coil at a timing shown in FIG. 10C.

In the above-described arrangement, however, the drive-timing in some cases deviates depending on the direction in which the coil is wound, with the result that a favourable driving condition with high efficiency can not be obtained. Namely, since the coil is driven at the timing shown in FIG. 10A, there arises no problem in a situation of FIG. 11A. If the winding direction is reversed, however, the repulsion-drive of the coil is, as shown in FIG. 11C, initiated from a point slightly before the timing shown in FIG. 10B, thus leading to considerable deterioration of efficiency. For this reason, it is required that the circuit be constructed, taking even the winding direction of coil into consideration at the time of manufacture.

Moreover, there is sensitivity with respect to noises of a power source, and driving pulses of the coil are often produced due to fluctuations in voltage of the power source.

The induction voltage in the aforementioned circuit is generated at the terminal p depicted in FIG. 9. If the induction voltage is greater than a reference voltage $v_r$, the transistor $T_2$ is turned OFF, while the transistor $T_1$ is turned ON. As a result, the driving current flows through the coil $L_2$. An ON-time $t_7$ of the transistor $T_1$ is determined by the time constants of the capacitor C and the resistance $R_1$.

Figure 12:
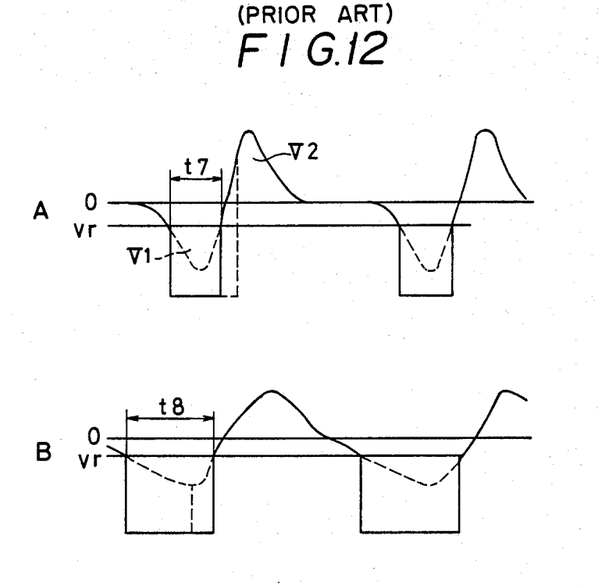

For the purpose of driving the magnet with high efficiency, it is desirable that the driving operation be effected at the timing shown in FIG. 10A, i.e., as illustrated in FIG. 12A, at the maximal point of the induction voltage $V_1$ in the case of attraction-drive. The reference voltage $v_r$ and a driving-time $t_7$ are adequately set to satisfy the above-described requirement.

In the great majority of cases, the drive-timing and the driving-time differ according to a length of a swing bar or a magnitude of swing angle when driving the pendulum.

In the above-mentioned circuit constitution, however, the driving-time is determined in terms of a single meaning by the time constants of the capacitor C and the resistance $R_1$, and the time constants must therefore be adjusted each time in accordance with the length of the swing bar or the magnitude of swing angle.

In addition, the reference voltage $v_r$ has to be properly adjusted in order to vary the drive-timing.

For instance, where the same pendulum as that of FIG. 12A is employed and the swing angle is made smaller than that in the former case, an amplitude of the induction voltage, as shown in FIG. 12B, becomes small, and there are created moderate variations in amplitude. In this case, the drive-timing has to be so adjusted that the driving pulses are generated at the maximal point of the induction voltage by adjusting the reference voltage $v_r$. Besides, it is necessary to cause the driving current to flow through the coil for a time $t_8$ longer than the above-mentioned one, and the time constants of the capacitor C and the resistance $R_1$ must be modified.

In such a case, as depicted with a dotted line of, e.g., FIG. 12A, if the driving-time is set to a value longer than the optimal time $t_7$, it follows that the swing angle becomes larger than is required. The driving current flows at a timing when an induction voltage $V_2$ having a reverse polarity is generated, resulting in wasteful consumption of electric current.

In a situation of FIG. 12B, as indicated by the dotted line, the driving-time is set to a value shorter than the optimal time $t_8$; therefore the necessary driving forces can not be obtained, and the pendulum ceases to swing in some cases.

Where the swing bars differ in length, the same adjustment as the above-mentioned one is needed, and similar defects are created.

As discussed above, some defects inherent in the prior art circuit consitution are present: both the time constants and the reference voltage of the circuit must be adjusted each time in accordance with the magnitude of swing angle or the length of swing bar; and if some deviation is produced in the adjustment, the electric current is wastefully consumed, or the pendulum stops.

Figure 13:
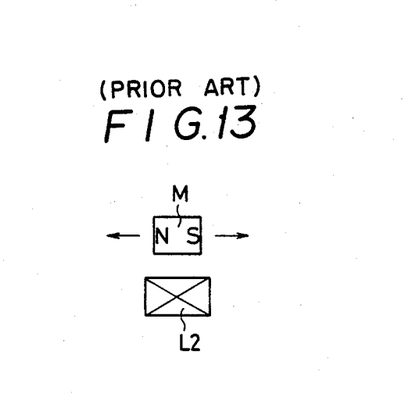
FIG. 13 is an explanatory diagram depicting another example of relation between a permanent magnet of a pendulum and a coil.
Figure 14:
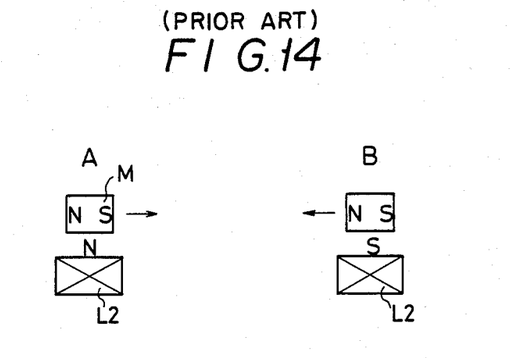
FIG. 14 is an explanatory diagram showing an exciting polarity of the coil in connection with the example of FIG. 13.

The foregoing conventional driving circuit for the pendulum can be used for a type in which the driving operation is performed by orienting two poles of the permanent magnet M, as illustrated in FIG. 13, toward the coil $L_2$ as well as for a type in which one pole of the permanent magnet M is, as explained earlier, disposed to stand vis-à-vis with a coil $L_2$. Description will herein be centered on the driving operation associated with the type shown in FIG. 13. As shown in FIG. 14A, the magnet M moves in a direction indicated by an arrowhead and is positioned opposite to the coil $L_2$. At this time, the coil $L_2$ is excited in such a direction as to stop the magnet M. Then occurs a maximal induction voltage $v_1$ illustrated in FIG. 15A. On the other hand, when the magnet M, as depicted in FIG. 14B, moves in the reverse direction and faces to the coil $L_2$. The coil $L_2$ is similarly excited in such a direction as to stop the magnet M. Then a maximal induction voltage $v_2$ shown in FIG. 15A is generated.

It is most desirable in terms of efficiency that the magnet is energized by causing the driving current to flow through the coil at the maximal point, viz., at the timing shown in FIG. 14A or 14B.

Figure 15:
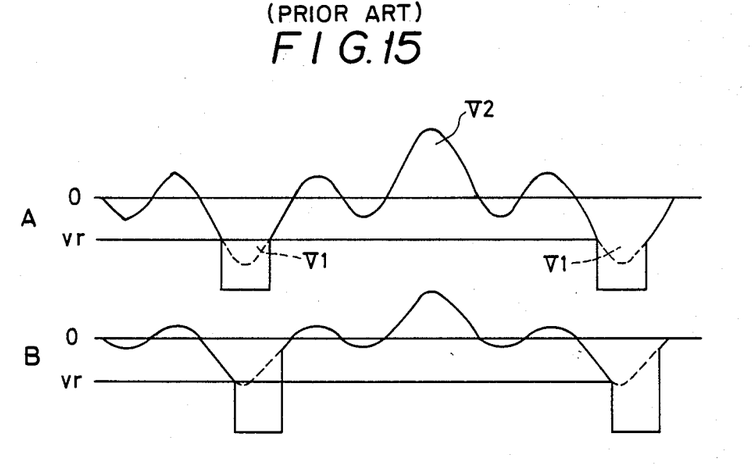
FIG. 15 is a voltage waveform diagram showing the operation of FIG. 9 in the relation shown in FIG. 13.

A threshold voltage of the transistor $T_2$ depicted in FIG. 9 is set to the voltage $v_r$ shown in FIG. 15. As a result of this, if the induction voltage exceeds the voltage $v_r$, the transistor $t_2$ is turned OFF, while the transistor $T_1$ is turned ON. Then, the driving current, as shown in FIG. 15A, flows through the coil $L_2$ at the timing of the induction voltage $v_1$ with the result that the magnet M is energized. As in the former case, some deviation is created in the timing at which the coil is driven because of fluctuations in amplitude of the induction voltage, thereby probably decreasing the driving efficiency.

Namely, as shown in FIG. 15B, when the amplitude of induction voltage diminishes, the timing at which the voltage $v_r$ is reached is delayed, and it follows that the driving current flows through the coil slower than the optimal timing.

While on the other hand, if the amplitude of induction voltage increases, the driving current flows in the coil faster than the optimal timing. In either case, there is a drop in driving efficiency. Such being the case, the deviation among the factors which exert influences on the amplitude of induction voltage must be eliminated in order to keep the driving efficiency optimal. Accuracy in manufacturing and assembling processes is strictly required.

A lengthy description of the prior art circuit constitution has been given above, but the biggest defect thereof is the incapableness of integrating the circuit constitution.

SUMMARY OF THE INVENTION

It is a primary object of the present invention to provide an electromagnetic driving circuit in which a circuit constitution thereof except a coil can be integrated.

To this end, according to one aspect of the invention, there is provided an electromagnetic driving circuit capable of driving the coil invariably at a highly efficient timing so as not to depend on the winding direction of the coil.

According to another aspect of the invention, there is provided an electromagnetic driving circuit capable of automatically optimally adjusting a generation timing and/or a pulse width of the driving pulse.

According to still another aspect of the invention, there is provided an electromagnetic driving circuit capable of driving the coil invariably at the highly efficient timing without being influenced by an amplitude of the induction voltage.

BRIEF DESCRIPTION OF THE DRAWINGS

These and other objects, features and advantages of the invention will become more apparent on reading the following detailed description in connection with the accompanying drawings, in which.

DETAILED DESCRIPTION OF THE PREFERRED EMBODIMENTS

Figure 1:
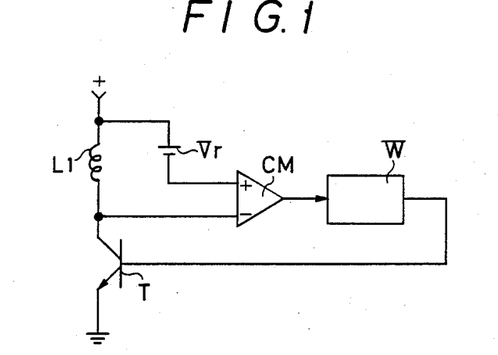
FIG. 1 is an electric circuit diagram illustrating one embodiment of the present invention.

In FIG. 1, the reference symbol $L_1$ designates a coil for detecting and driving a permanent magnet (not illustrated); $v_r$ denotes a reference voltage source; and CM represents a comparator for comparing an induction voltage of the coil $L_1$ with a reference voltage. The symbol W represents a one-shot pulse generating circuit, and T represents a transistor constituting a driving circuit. The circuit constitutions except a coil $L_1$ can be integrated.

Based on this constitution, the induction voltage is compared with a reference voltage $v_r$ by means of the comparison circuit CM. If the induction voltage exceeds the reference voltage $v_r$, outputs are generated from the comparison circuit CM, and pulses having a time t are produced from the one-shot pulse generating circuit W. These pulses cause the transistor T to turn ON, and the driving current flows through the coil $L_1$, thereby driving the permanent magnet.

Figure 2:
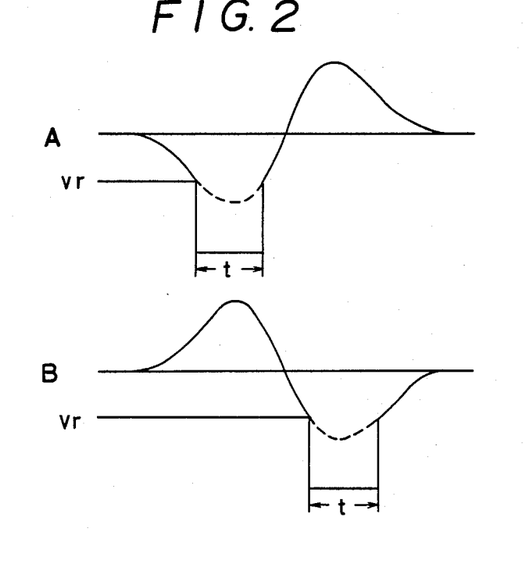
FIG. 2 is a voltage waveform diagram showing the operation of FIG. 1.

That is, the induction voltage is, as illustrated in FIG. 2A or 2B, generated in the coil $L_1$ according to the direction in which the coil is wound. In either case, the driving current continues to flow during the time t when the induction voltage is greater than the reference voltage $v_r$. Hence, there is always a flow of driving current at the peak of induction voltage regardless of the winding direction of the coil, this leading to a highly efficient condition of drive.

Figure 3:
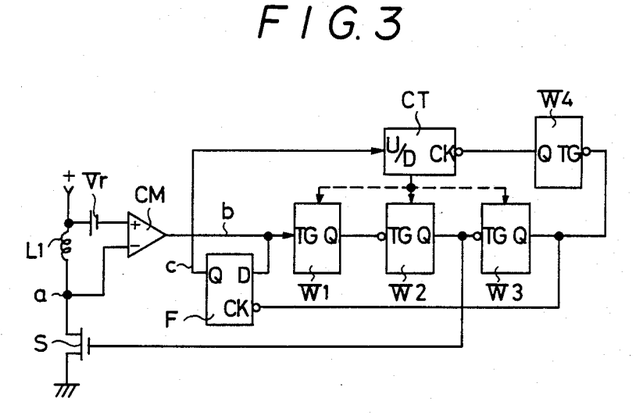
FIG. 3 is an electric circuit diagram illustrating another embodiment of the present invention.

Directing now attention to FIG. 3, there is illustrated another embodiment of the present invention. In the Figure, this symbols $W_1$ through $W_4$ denote one-shot pulse generating circuits. Pulse widths of the one-shot pulse generating circuits $W_1$, $W_3$ and $W_4$ are set to $t_1$, $t_3$ and $t_4$, respectively. The one-shot pulse generating circuit $W_2$ involves the use of a programmable one-shot circuit the pulse width of which is variable. The symbol F represents a flip-flop circuit, and CT indicates an up-down counter. The one-shot pulse generating circuit $W_3$ and the flip-flop circuit F are combined to constitute a judgement circuit, while the one-shot pulse generating circuit $W_4$ and the counter CT cooperate to constitute a control circuit. A transistor generally indicated at S forms a driving circuit. The same symbols as those in FIG. 1 indicate the like components.

Next, the operation will be described referring to FIG. 4. Assuming that a content in the counter CT is now n, the pulse width of the one-shot pulse generating circuit $W_2$ is set to $t_2$ by dint of the outputs thereof.

Figure 4:
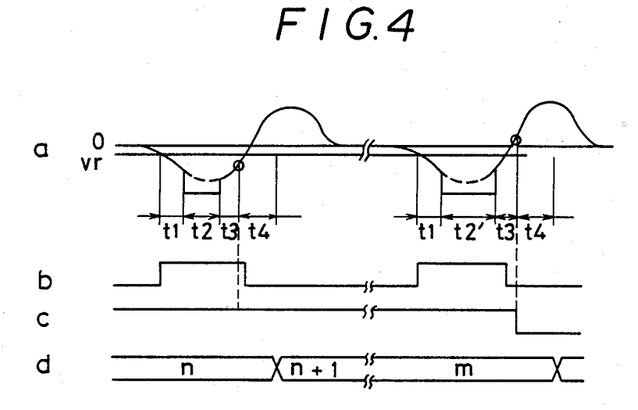
FIGS. 4 and 5 are voltage waveform diagrams showing in combination the operation of FIG. 3.

If the induction voltage of the coil $L_1$, as shown in FIG. 4a, exceeds the reference voltage $v_r$, the outputs, as shown in FIG. 4b, occur from the comparison circuit CM. The pulse having a width $t_1$ is accordingly produced from the one-shot pulse generating circuit $W_1$. A driving pulse having a width $t_2$ is generated from the one-shot pulse generating circuit $W_2$ at the falling of the aforementioned pulses, thereby turning ON the transistor S. Then the driving current flows in the coil $L_1$. A pulse having a width $t_3$ is produced from the one-shot pulse generating circuit $W_3$ at the falling end of the driving pulse; and both the flip-flop circuit F and the one-shot pulse generating circuit $W_4$ are triggered by the falling thereof. An input D of the flip-flop circuit F is supplied with outputs of the comparison circuit CM, and this output-condition is read to the flip-flop circuit F. Specifically, this step is to judge whether a level of induction voltage at the falling of the pulse from the one-shot pulse generating circuit $W_3$ is greater than the reference voltage $v_r$ or not. If it exceeds the reference voltage, the output of the flip-flop circuit F comes to "1", and the counter CT is brought into an up-mode. Namely, in this case, it is judged that the width of driving pulse is too small, and the pulse is not generated in a highly efficient manner in the vicinity of the maximal point of the induction voltage.

On the other hand, a pulse having a width $t_4$ is given forth from the one-shot pulse generating circuit $W_4$ at the falling of the pulse from the one-shot pulse generating circuit $W_3$. The pulse associated with the one-shot pulse generating circuit $W_4$ becomes the clock input of the counter CT, whereby the content of the counter CT is upped by one. Then the content, as illustrated in FIG. 4d, becomes (n+1). Therefore, the width of the pulse of the one-shot pulse generating circuit $W_3$ is set to a larger width than that in the previous case.

Therefore, since the next driving pulse width becomes long, the pulse width of the driving pulse is corrected.

After this operation has been repeated, the counter content becomes m, and the driving pulse width, as illustrated in FIG. 4a, comes to $t_2$. At this time, if the level of induction voltage at the falling of the pulses of the one-shot pulse generating circuit $W_3$ is lower than the reference voltage, the output of the flip-flop circuit F is, as shown in FIG. 4c, inversed to "0", and the counter CT is put into a down-mode. Hence, the content of the counter CT is downed to (m−1), and the next driving pulse width is reduced by one step.

The driving pulse width is changed over alternately to $t_2$ and the width smaller than $t_2$ by one step, thus coming into a stable state.

In this way, the driving pulse width automatically comes to a predetermined value at the optimal timing, thereby stabilizing the specified swing angle.

Figure 5:
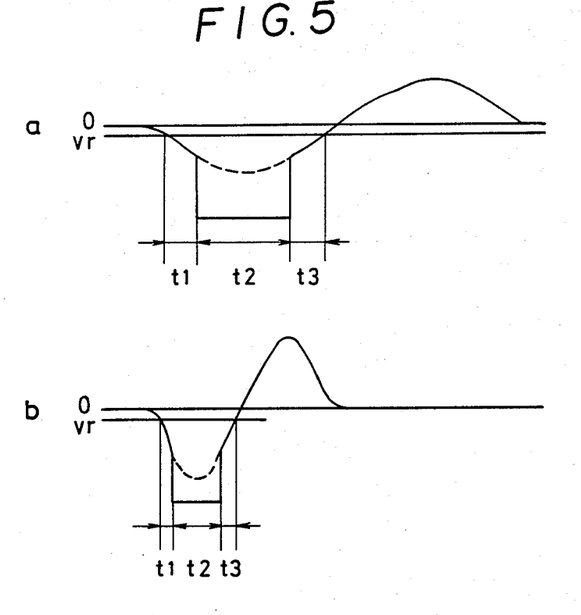

In the above-described example, only the driving pulse width is adjusted. The arrangement is not, however, confined to this manner. A programmable one-shot circuit serves as the one-shot pulse generating circuits $W_1$ and $W_3$, and the pulse width thereof may properly be adjusted in accordance with the content of the counter CT. For instance, where the swing angle of the pendulum is set to a small value, it is required to stabilize the times $t_1$ through $t_3$ to assume, as illustrated in FIG. 5a, a slightly lengthy configuration. It is because the amplitude of induction voltage is, as shown in FIG. 5a, small in the stable state, and the variation is moderate. If the swing angle of the pendulum is set to a large value, the amplitude of induction voltage is, as depicted in FIG. 5b, large in the stable state, and the variation thereof is sharp. Hence, the driving pulse width may be small. It is therefore necessary for the times $t_1$ through $t_3$ to be stabilized within a relatively shorter time than that of FIG. 5a. A ratio of the time $t_2$ to the times $t_1$ and $t_3$ in FIG. 5a is different from that in FIG. 5b. The swing angle with stability is set by adjusting this ratio. For example, when obtaining the stability in the state shown in FIG. 5b, the pulse widths of the one-shot pulse generating circuits $W_1$ to $W_3$ are so set that the respective times have the ratio shown in FIG. 5b. Subsequently, the setting is so performed that the individual pulse widths may be varied keeping that ratio in accordance with the content of the counter CT.

The times $t_1$ through $t_3$ are automatically adjusted in the following manner, thereby stabilizing a desired swing angle. Provided that the pulse widths of the one-shot pulse generating circuits $W_1$ to $W_3$ are set to the value of FIG. 5b on the basis of the content of the counter CT in the initial state, the power source is inputted in this state. Then the swing of the pendulum is begun. Initially, the swing angle is small, and hence the induction voltage approximate to that of FIG. 5a is produced. For this reason, the induction voltage is in excess of the reference voltage at the falling of the pulses from the one-shot pulse generating circuit $W_3$. The driving pulse width is judged to be small, and the content of the counter CT is thereby upped by one. times $t_1$ through $t_3$ are each set to become longer by one step. The times $t_1$ through $t_3$ are incremented stepwise by repeating this operation. Thus, the driving pulse widths gradually increase. Followed by this increment, the swing angle of the pendulum gradually augments a little bit behind that timing. The amplitude of induction voltage increases with this augmentation.

As a result, there is a surplus in the driving pulse width at a certain timing. Then the counter CT is changed over to the down-mode. The times $t_1$ through $t_3$ diminish. Followed by this diminution, the swing angle of the pendulum decreases slightly behind that timing.

The aforementioned operations are repeated, thus approaching the state depicted in FIG. 5b, and finally this state is brought into stability. That is, automatic adjustment is effected so that the driving operation is efficiently carried out with the optimal driving pulse width at the maximal point of the induction voltage.

On the other hand, the pulse width $t_3$ of the one-shot pulse generating circuit $W_3$ is so set that the level of induction voltage is decided at such a timing as to obtain the easiest judgement of the induction voltage. However, the setting of the pulse width requires consideration of the following conditions.

From the coil $L_1$ is produced ringing generally for approximately 1 ms when the driving pulses halt. Inasmuch as the induction voltage of the coil $L_1$ loses its stability during the occurrence of this ringing, there exists a probability that a malfunction may happen, if the judgement about the induction voltage is to be made during this period. To cope with this, the output width $t_3$ of the one-shot pulse generating circuit $W_3$ is set to exceed the time for which the ringing is taking place in order that the level of induction voltage can be judged under the stable condition.

In the above-described embodiment, the automatic control is effected by making variable the pulse width of the one-shot pulse generating circuit. The reference voltage may, however, be adjusted by the outputs of the counter CT, which adjustment involves the use of a variable-voltage source serving as the reference voltage source $v_r$. This adjustment of reference voltage permits the adjustment of the timing at which the driving pulses are generated as well as that of the pulse width of the one-shot pulse generating circuit $W_1$. In this case, both the width of driving pulse and the timing of generation are adjusted simultaneously by adjusting the pulse width of the one-shot pulse generating circuit $W_2$.

In the aforementioned embodiment, set to the same voltage $v_r$ are the reference voltage for determining the timing at which the driving operation is initiated and another reference voltage for judging the level of induction voltage after termination of the driving operation. The latter reference voltage may be modified on the basis of the content of the counter. For instance, the variable-voltage source is employed as the reference voltage source, and the voltage thereof is changed over to a voltage corresponding to the content of the counter CT only during a period for which output pulses are generated from the one-shot pulse generating circuits $W_2$ to $W_4$. This arrangement has an effect equivalent to that of adjusting the pulse width of the one-shot pulse generating circuit $W_3$.

In general, the amplitude of the induction voltage undergoes the influences caused by fluctuations in voltage of the power source. If the amplitude of induction voltage fluctuates, the timing when increasing over the refence voltage deviates, resulting in fluctuations both in the drive-timing and in the driving-time. According to the foregoing embodiment, the reference voltage $v_r$ is set to a low value having less influences of the fluctuations in voltage in order to minimize the influences derived from the fluctuations in the power source. Subsequently, there is created a delay equivalent to the time $t_1$ since the occurrence of outputs of the comparison circuit by means of the one-shot pulse generating circuit $W_1$. From this moment the drive is started. However, unless the fluctuations in voltage of the power source are taken into consideration, the one-shot pulse generating circuit $W_1$ is not necessarily provided. The outputs of the comparison circuit CM may be supplied directly to the one-shot pulse generating circuit $W_2$.

In the above-described embodiment, the clock pulses are supplied to the counter CT per driving pulse. For example, however, the content of the counter CT for the first time may be upped by one, if the up-down mode of the counter CT remains invariable during a sequence of three driving pulses. The situation is the same with the down mode.

In this case, a ternary counter is provided between the one-shot pulse generating circuit $W_4$ and the counter CT. The arrangement may be such that this ternary counter is reset for every inversion of the output level of the flip-flop circuit F. This makes it possible to prevent the malfunction caused by noises or the like.

Figure 6:
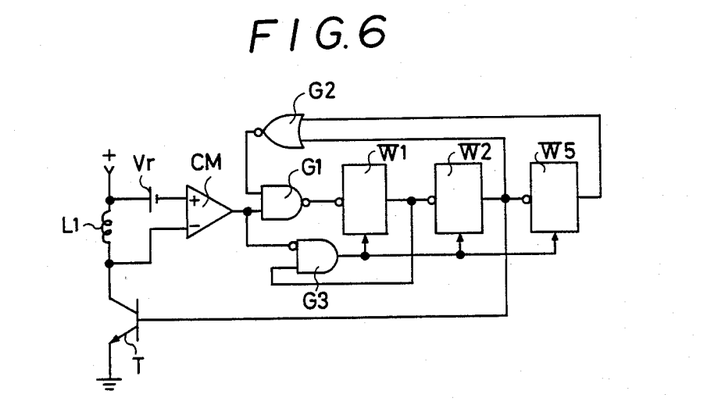
FIG. 6 is an electric circuit diagram illustrating still another embodiment of the present invention.
Figure 7:
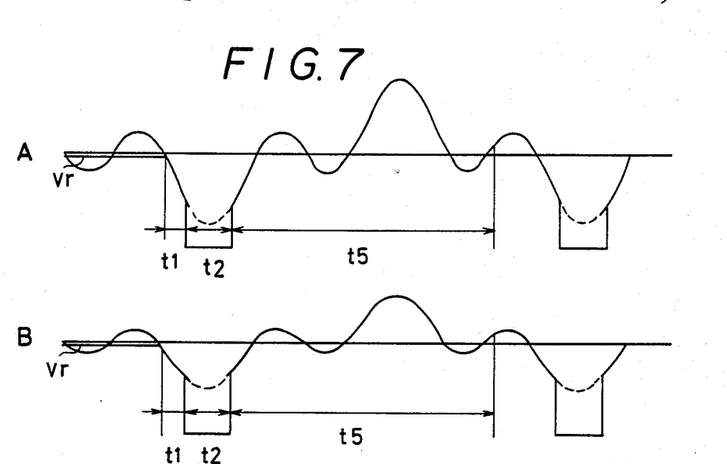
FIGS. 7 and 8 are voltage waveform diagrams showing in combination the operation of FIG. 6.

Next, another embodiment of the present invention will be discussed with reference to FIG. 6. In this Figure, $v_r$ designates a reference voltage generating source from which a reference voltage assuming, as illustrated in FIG. 7, a lower level than the previous one is generated. The symbols $G_1$ and $G_2$ denote gate circuits; $G_3$ represents a gate circuit constituting an inhibit circuit. The symbol $W_5$ stands for a one-shot pulse generating circuit for generating pulses each having a width $t_5$. The same symbols as those in FIG. 3 indicate the like components.

In such a configuration, the permanent magnet involves the use of such a bipolar magnet as depicted in FIG. 13. The induction voltage of the coil $L_1$ is compared with the reference voltage $v_r$ by means of the comparison circuit CM. If the induction voltage is, as illustrated in FIG. 7A, in excess of the reference voltage $v_r$, the comparison circuit CM gives forth the outputs, whereby the one-shot pulse generating circuit $W_1$ is triggered through the gate circuit $G_1$; and a pulse having a width $t_1$ is generated by dint of the output thereof. At the maximal point of the induction voltage, the time $t_1$ is preset to a period extending from the time when the induction voltage exceeds the reference voltage to the time when the driving pulse is generated at the optimal timing. To be specific, the one-shot pulse generating circuit $W_2$ is triggered by the falling end of the foregoing pulse; and a pulse having a width $t_2$ is produced by dint of the output thereof. This driving pulse causes the transistor T to be turned ON, and the driving current then flows in the coil $L_1$. The magnet is energized at the optimal timing.

The one-shot pulse generating circuit $W_5$ is triggered by the falling of this driving pulse; and a pulse having a width $t_5$ is generated by the output thereof. This pulse and the previous driving pulse as well are supplied to gate circuit $G_2$, while the gate circuit $G_1$ remains closed during the occurrence of each individual pulse. Namely, even if the outputs are produced from the comparison circuit CM, the one-shot pulse generating circuit $W_1$ is never triggered for the times $t_2$ and $t_5$ shown in FIG. 7, thereby preventing the malfunction. The reason for this is that: because the reference voltage $v_r$ is set at a low level, the induction voltage in some cases exceeds the reference voltage, excluding the maximal point; and in such a situation the generation of driving pulse is prevented.

It is to be noted that the output of the one-shot pulse generating circuit $W_1$ is fed to the gate circuit $G_2$, and the gate circuit $G_1$ may continue to be closed for the time $t_1$.

The output of the one-shot pulse generating circuit $W_1$ is—though not stated in the description given above—fed to the gate circuit $G_3$, and the gate circuit $G_3$ remains open during the generation of its pulse. Hence, if the comparison circuit CM ceases to output during that period, the one-shot pulse generating circuits $W_1$, $W_2$ and $W_5$ are reset, and the occurrence of the driving pulse is thereby inhibited. This action is intended to prevent the malfunction attributed to the noises or the induction voltages except the maximal point. Only when continuously exceeding the reference voltage over the time $t_1$, it is deemed to be a maximal induction voltage. In this case alone, the driving pulse may be generated.

In the above-described constitution, even if the amplitude of induction voltage, as depicted in FIG. 7B, diminishes, since the reference voltage $v_r$ is set to the low level, the amplitude-fluctuations in the vicinity thereof are extremely small. Furthermore, the timing at which the output of the comparison circuit CM is much the same as that shown in FIG. 7A. Hence, the generation timing of driving pulse does not substantially deviate, and the driving pulses can surely be produced at the maximal point of induction voltage. The situation is the same with a case where the induction voltage increases in amplitude.

Figure 8:
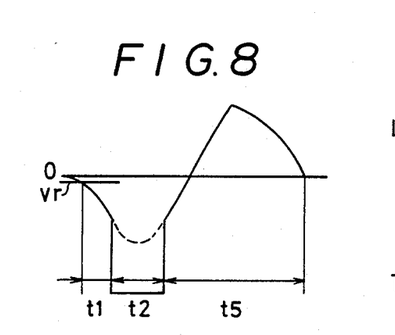

In the above-described example, the explanation is focused on the bipolar magnet depicted in FIG. 13, but the application may include the use of such a single-pole magnet as shown in FIG. 10. In this case, illustration of an induction voltage waveform is given in FIG. 8. As in the former case, the driving current flows through the coil at the maximal point of induction voltage.

The present invention provides the following effects. It is practicable to integrate of all components except the coil. Miniaturization in size and a decrease in cost can be attained.

The coil can be driven constantly with high efficiency regardless of the direction in which the coil is wound. It is therefore feasible to assemble the parts without considering the winding direction of the coil at the time of manufacture, this bringing about a reduction in time required for the assembly.

Furthermore, the present invention provides the constitution which is resistive against noises of a power source line and is suited to the integration because of no provision of a capacitor.

The drive-timing and/or the driving pulse width is adjusted by judging a level of induction voltage at the predetermined timing after stopping the driving pulses, and hence the automatic control is effected so that the driving operation is performed in a highly efficient manner invariably at the maximal point of the induction voltage. The permanent magnet can efficiently be driven with a stable amplitude.

In addition, it is possible to drive pendulums each having a different inherent cycle at the optimal timing during the optimal driving-time.

The driving current is arranged to flow in the coil with a delay of specified time when the induction voltage of the coil is in excess of the reference voltage, whereby the reference voltage can be set at a low level. By virtue of this arrangement, the timing at which the driving pulses are generated undergoes almost no influence caused by the fluctuations in amplitude of the induction voltage. This permits the driving current to run through the coil constantly at the most efficient timing. Hence, the manufacturing and assembling processes do not require so high accuracy as the prior art does, resulting in simplification of these processes.

After the outputs have once been generated from the comparison circuit, the malfunction that is due to noises and the induction voltages except the maximal point can be prevented by prohibiting regeneration of outputs of the comparison circuit during the setting process and by generating the driving pulses only when the induction voltage is continuously greater than the reference voltage over the predetermined period.

As many apparently widely different embodiments of this invention may be made without departing from the spirit and scope thereof, it is to be understood that the invention is not limited to the specific embodiments thereof except as defined in the appended claims.

What is claimed is:

1. An electromagnetic driving circuit comprising:
a coil for detecting and driving a permanent magnet;
a comparison circuit for comparing an induction voltage induced in said coil with a reference voltage;
an output generating circuit for generating a driving pulse having a predetermined width in response to outputs of said comparison circuit; and
a driving circuit functioning in accordance with said driving pulse of said output generating circuit for causing a driving current to flow through said coil.

2. An electromagnetic driving circuit comprising:
a coil for detecting and driving a permanent magnet;
a comparison circuit for generating outputs when an induction voltage induced in said coil is in excess of a reference voltage;
a pulse generating circuit for generating a driving pulse having a predetermined width in response to the generation of said outputs of said comparison circuit;
a driving circuit functioning in accordance with said driving pulse for causing a driving current to flow through said coil;
a judgement circuit for judging a level of said induction voltage at a predetermined timing after halting the generation of said driving pulse; and
a control circuit for controlling a generation timing and/or a pulse width of said next driving pulse by receiving outputs of said judgement circuit.

3. An electromagnetic driving circuit comprising:
a coil for detecting and driving a permanent magnet;
a comparison circuit for generating outputs when an induction voltage induced in said coil is greater than a reference voltage;
an output generating circuit for generating a driving pulse having a predetermined width with a delay of predetermined time from generation of said outputs of said comparison circuit; and
a driving circuit functioning in accordance with said driving pulse generated by said output generating circuit for causing a driving current to flow through said coil.

4. An electromagnetic driving circuit comprising:
a coil for detecting and driving a permanent magnet;
a comparison circuit for generating outputs when an induction voltage induced in said coil exceeds a reference voltage;
an output generating circuit for generating a driving pulse having a predetermined width with a delay of predetermined time from generation of said outputs of said comparison circuit;
a driving circuit functioning in accordance with said driving pulse generated from said output generating circuit for causing a driving current to flow through said coil; and
a prohibit circuit for prohibiting a supply of said outputs from said comparison circuit to said output generating circuit during a preset period from a predetermined timing after generating said outputs from said comparison circuit.

5. An electromagnetic driving circuit comprising:

a coil for detecting and driving a permanent magnet;

a comparison circuit for generating outputs when an induction voltage induced in said coil exceeds a reference voltage;

an output generating circuit for generating a driving pulse having a predetermined width with a delay of predetermined time from generation of said outputs of said comparison circuit;

an inhibit circuit for inhibiting the generation of said driving pulse of said output generating circuit when said outputs of said comparison circuit discontinue within said predetermined time; and a driving circuit functioning in accordance with said driving pulse generated from said output generating circuit for causing a driving circuit to flow through said coil.

* * * * *